(12) United States Patent
Gindele et al.

(10) Patent No.: US 6,807,300 B1
(45) Date of Patent: Oct. 19, 2004

(54) NOISE REDUCTION METHOD UTILIZING COLOR INFORMATION, APPARATUS, AND PROGRAM FOR DIGITAL IMAGE PROCESSING

(75) Inventors: Edward B. Gindele, Rochester, NY (US); Andrew Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 763 days.

(21) Appl. No.: 09/620,000

(22) Filed: Jul. 20, 2000

(51) Int. Cl.⁷ .............................................. G06K 9/00
(52) U.S. Cl. ..................... 382/167; 382/275; 358/368
(58) Field of Search .................. 382/167, 162, 382/205, 254, 260–266, 210, 268–269, 274–275; 358/3.26–3.27, 515, 520, 368; 348/607–624

(56) References Cited

U.S. PATENT DOCUMENTS

| | | | |
|---|---|---|---|
| 4,689,666 A | 8/1987 | Hatanaka | 348/624 |
| 5,682,443 A | 10/1997 | Gouch et al. | 382/254 |
| 5,689,590 A | 11/1997 | Shirasawa et al. | 382/254 |
| 5,768,440 A * | 6/1998 | Campanelli et al. | 382/261 |
| 5,903,681 A * | 5/1999 | Rueby et al. | 382/266 |
| 5,999,279 A | 12/1999 | Kouzaki et al. | 358/520 |
| 6,625,325 B2 * | 9/2003 | Gindele et al. | 382/260 |

FOREIGN PATENT DOCUMENTS

| | | | | |
|---|---|---|---|---|
| EP | 0617548 A1 * | 3/1994 | | H04N/1/46 |
| EP | 1174824 A2 * | 7/2001 | | G06T/5/20 |
| EP | 1209621 A2 * | 9/2001 | | G06T/5/20 |
| JP | 09-114975 | 5/1997 | | G06T/5/20 |

OTHER PUBLICATIONS

Palubinskas, Adaptive filtering in magnetic resonance images, IEEE 1015–4651/96, pp. 523–527.*

Wang et al., Gradient Inverse Weighted Smoothing Scheme and the Evalution of its Performance, Computer Graphics and Image Processing, Academic Press Inc, 0146–664X/81, pp. 167–181.*

Image enhancement using color and spatial information, Fotopoulos et al., IEEE 0–8186–7919–0/97, 2581–2583.*

"Digital Image Smoothing and the Sigma Filter", Computer Vision, Graphics, and Image Processing, vol. 24, pp 255–269, 1983, by: Jong–Sen Lee.

* cited by examiner

Primary Examiner—Leo Boudreau
Assistant Examiner—Ishrat Sherali
(74) Attorney, Agent, or Firm—William F. Noval (57) ABSTRACT

A digital image processing method for reducing the noise of a color digital image having pixel values, includes the steps of: identifying one or more color regions in color space; identifying a pixel of interest in the color digital image; calculating a color weighting factor for the pixel of interest; using the color weighting factor and the values of pixels sampled from a local neighborhood of pixels about the pixel of interest to calculate a noise reduced pixel value; replacing the original value of the pixel of interest with the noise reduced pixel value; and repeating the steps for other pixels in the digital image.

61 Claims, 6 Drawing Sheets

NOISE REDUCTION METHOD UTILIZING COLOR INFORMATION, APPARATUS, AND PROGRAM FOR DIGITAL IMAGE PROCESSING

FIELD OF THE INVENTION

The present invention relates to a method, apparatus, and computer program for processing color digital images to reduce noise.

BACKGROUND OF THE INVENTION

The image structure of color digital images can be thought of as made up of two components: a signal component and a noise component. In many digital imaging applications it is desirable to amplify the signal component while in the same instance reduce the noise component. The difficulty of achieving both these goals for a color digital image processing application simultaneously lies in the inherent differentiability of the signal and noise components. No technology at present achieves a perfect decomposition of image data into these two components. Thus current image processing noise reduction algorithms result in either some loss of the signal component or not enough noise component removal or both. It has been recognized in the image photographic field that the color of different real world objects can be used to advantage with regard to signal and noise processing.

In U.S. Pat. No. 5,682,443 Gough and MacDonald disclose a method of processing color digital images for the purposes of spatial sharpness characteristic enhancement. In this disclosure, a method of unsharp masking is discussed which separates an original color digital image into two parts based on the spatial frequency content of the original color digital image. The difference between the original pixel values and a low spatial frequency component of the original pixel values forms a fringe component, or high spatial frequency component. Gough and MacDonald teach a method of modifying the fringe component based on the color of either the low spatial frequency component or the original pixel values. Their method also discloses that the preferred method of implementing this feature uses a continuous mathematical function of color. The method disclosed by Gough and MacDonald takes advantage of color as an image characteristic for enhancing the spatial detail. However, the unsharp masking procedure employed by Gough and MacDonald is designed to vary the amplification of the signal component and is not effective for the purposes of reducing of the noise component.

In U.S. Pat. No. 4,689,666 Hatanaka discloses a method of using the color characteristics of a color digital image for the purposes of reducing the noise component of the color digital image. In the method disclosed, Hatanaka describes a process of extracting color data for each picture element of the image, discriminating regions of the color digital image exhibiting a specific color on the basis of the extracted color data, and subjecting the image signal to spatial image processing for elimination of noise under different processing conditions for regions exhibiting the specific color and the remaining regions not exhibiting the specific color. Thus the method taught by Hatanaka has as a fundamental step the segmentation, or discrimination, of each pixel as belonging to the specific color or not belonging to the specific color. The step color discrimination can lead to unevenness in the processed images due to the on/off nature of the color identification process.

There is thus a need for a noise reduction algorithm which uses the color characteristic of a color digital image to advantage the process of noise reduction in a smooth and even manner without producing switching artifacts typical of segmentation based decision based methods.

SUMMARY OF THE INVENTION

The need is met according to the present invention by providing a digital image processing method for reducing the noise of a color digital image having pixel values, that includes the steps of: identifying one or more color regions in color space; identifying a pixel of interest in the color digital image; calculating a color weighting factor for the pixel of interest, the color weighting factor being a near continuous function of the one or more color regions; using the color weighting factor and the values of pixels sampled from a local neighborhood of pixels about the pixel of interest to calculate a noise reduced pixel value; replacing the original value of the pixel of interest with the noise reduced pixel value; and repeating the steps for other pixels in the color digital image.

ADVANTAGES

The present invention has the advantage that noise reduction is applied to preferentially treat different regions of color space in a continuous fashion so that spatial artifacts are avoided. It has the further advantage that different color regions, such as skin, sky, and grass can be treated differently to obtain a pleasing image.

DETAILED DESCRIPTION OF THE INVENTION

A color digital image is comprised of a two or more digital image channels. Each digital image channel is comprised of a two-dimensional array of pixels. Each pixel value relates to the amount of light received by the imaging capture device corresponding to the geometrical domain of the pixel. For color imaging applications a color digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of color digital images. Those skilled in the art will recognize that the present invention can be applied to, but is not limited to, a color digital image for any of the above mentioned applications.

Although the present invention describes a digital image channel as a two dimensional array of pixel values arranged by rows and columns, those skilled in the art will recognize that the present invention can be applied to mosaic (non rectilinear) arrays with equal effect. Those skilled in the art will also recognize that although the present invention describes replacing original pixel values with tone brightness adjusted pixel values, it is also trivial to form a new color digital image with the noise cleaned pixel values and retain the original pixel values.

Figure 1:
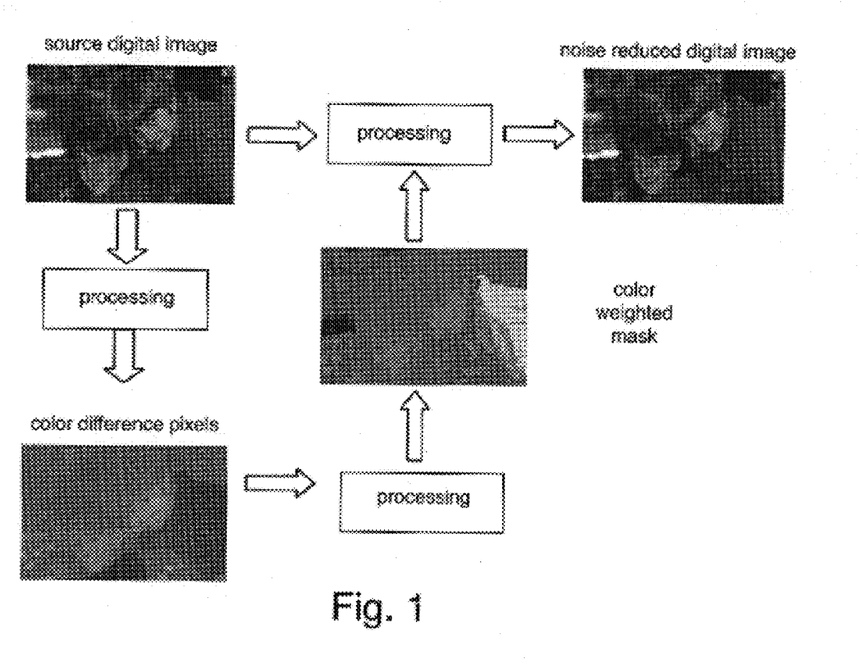
FIG. 1 is a pictorial diagram showing a color digital image and a visualization of the corresponding color-based noise reduction processing produced with the application of the present invention.

FIG. 1 shows a pictorial diagram of one of the important aspects of the present invention. An example source color digital image is shown as input to a first processing module which produces a color difference value for each pixel. A second processing module produces a color weighting mask This color weighting mask is used by a third processing module to produce a noise reduced color digital image.

General Description of a Digital Imaging System Application

Figure 2:
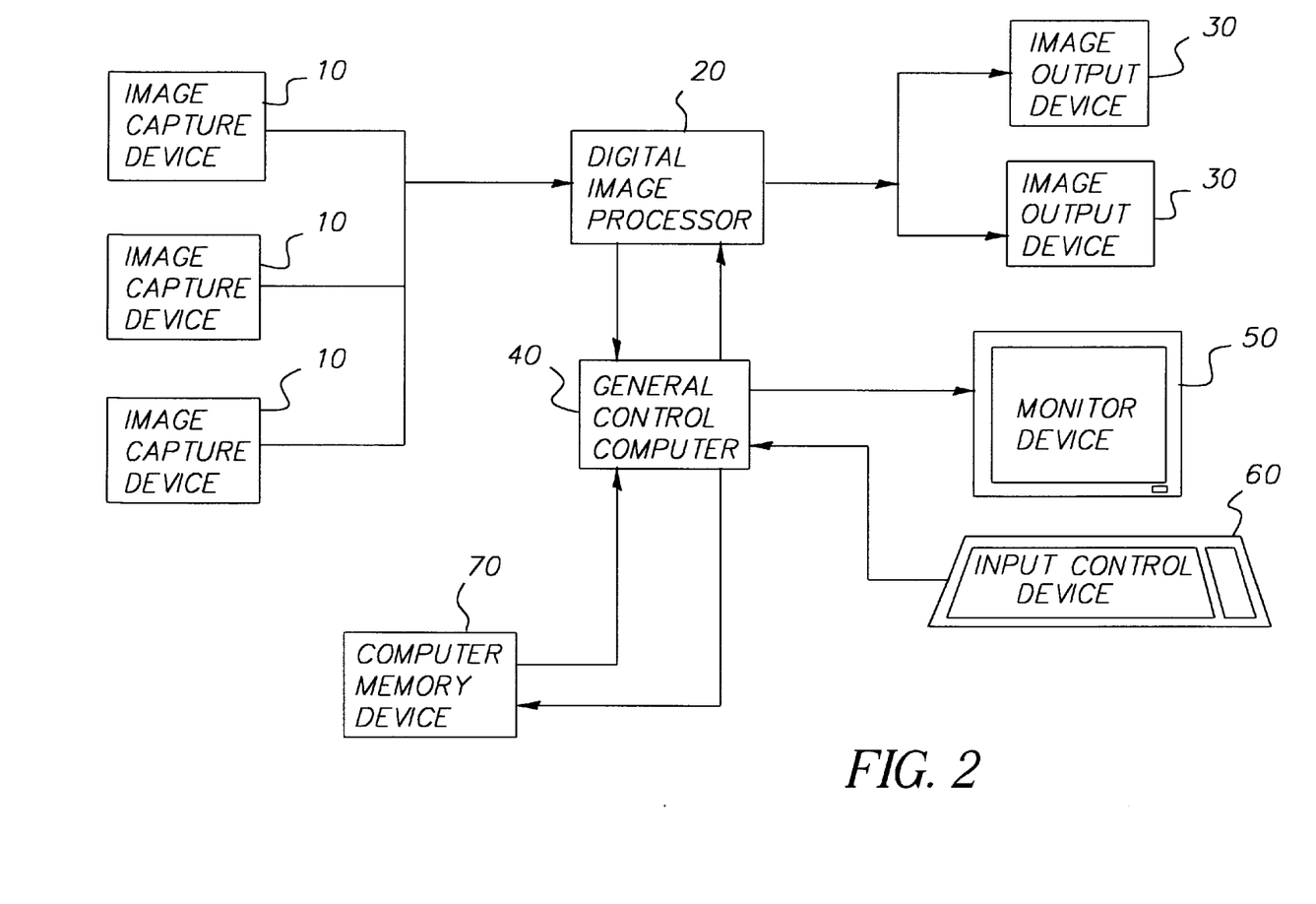
FIG. 2 is a block diagram showing an image processing system suitable for practicing the present invention.

The present invention may be implemented in computer hardware. Referring to FIG. 2, the following description relates to a digital imaging system which includes an image capture device 10, a digital image processor 20, an image output device 30, and a general control computer 40. The system may include a monitor device 50 such as a computer console or paper printer. The system may also include an input device control for an operator such as a keyboard and or mouse pointer. Still further, as used herein, the present invention may be implemented as a computer program and may be stored in a computer memory device 70 i.e. a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well-known computer system, such as a personal computer.

Multiple capture devices 10 are shown illustrating that the present invention may be used for color digital images derived from a variety of imaging devices. For example, FIG. 2 may represent a digital photofinishing system where the image capture device 10 is a conventional photographic film camera for capturing a scene on color negative or slide film and a film scanner device for scanning the developed image on the film and producing a color digital image. The digital image processor 20 provides the means for processing the color digital images to produce pleasing looking images on the intended output device or media. Multiple image output devices 30 are shown illustrating that the present invention may be used in conjunction with a variety of output devices which may include a digital photographic printer and soft copy display. The digital image processor 20 processes the color digital image to adjust the overall brightness and/or tone scale of the color digital image in a manner such that a pleasing looking image is produced by a image output device 30. The interaction between these processing steps is explained in more detail below.

General Description of a Digital Image Process or 20

Figure 3:
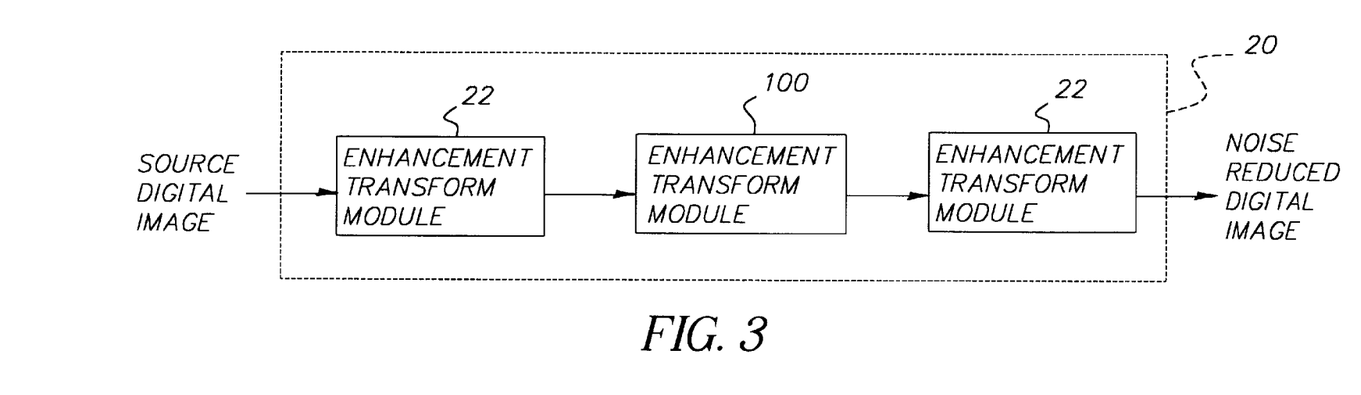
FIG. 3 is a block diagram showing image processing according to one embodiment of the present invention.

The digital image processor 20 shown in FIG. 2 is illustrated in more detail in FIG. 3. The general form of the digital image processor 20 employed by the present invention is a cascaded chain of image processing modules. The source color digital image is received by the digital image processor 20 which produces on output a processed color digital image. Each image processing module contained within the digital image processor 20 receives a color digital image, modifies the color digital image or derives some information from the color digital image, and produces passes its output color digital image to the next image processing module. Two enhancement transform modules 22 are shown as the first and last image processing modules within the digital image processor 20 to illustrate that the present invention can be used in conjunction with other image processing modules. Examples of enhancement transform modules 22 might include, but are not limited to, modules designed to sharpen spatial detail, enhance color, enhance contrast, and enhance the tone scale of a color digital image. It should be understood within the context of the discussion of the present invention that the term input color digital image and output color digital image refers to the color digital image received and produced by an image processing module respectively.

Preferred Digital Image Processor 20

Figure 4:
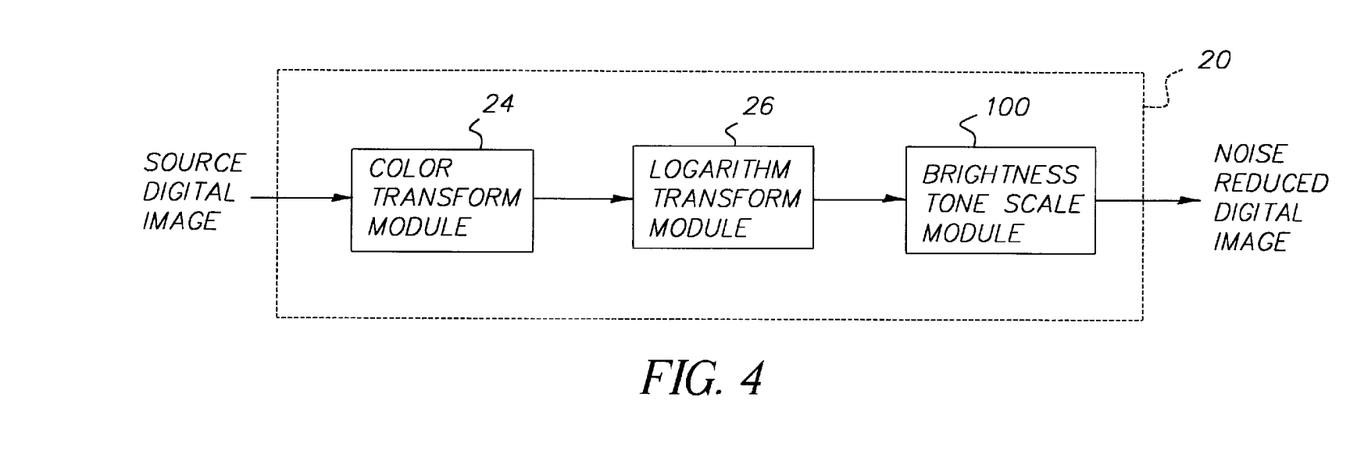
FIG. 4 is a block diagram showing image processing according to a preferred embodiment the present invention.

The cascaded chain of image processing modules employed by the present invention is shown in FIG. 4. The source color digital image produced by the capture device 10 is received by a color transform module 24. The output color digital image produced by the color transform module 24 is received by the logarithm transform module 26. The output color digital image produced by the logarithm transform module 26 is received by the noise reduction module 100. The output color digital image produced by the noise reduction module 100 constitutes the noise reduced color digital image produced by the digital image processor 20 shown in FIG. 2.

Details of the Color Transform Module 24

A characteristic of the color digital image produced by a capture device 10 which can impact the effectiveness of the present invention is the color space metric associated with the capture devices which produce color digital images. Typically the capture device 10 incorporates three color spectral filters which determine the relative amounts of colored light received by the photosensitive transducer elements. Depending on the characteristics of the spectral filters, better results may be achieved with the present invention if a color transform is applied to the color digital image preceding the application of the noise reduction module 100. Although the application of a color transform is not required to practice the present invention, optimal results may be achieved if a color transform is applied based on the spectral characteristics of the input and/or output devices.

The color transform method employed by the present invention is a 3 by 4 matrix transformation. This transformation generates new color pixel values as linear combinations of the input color pixel values. The input color digital image consists of a red, green, and blue digital image channels. Each digital image channel contains the same number of pixels. Let $R_{ij}$, $G_{ij}$, and $B_{ij}$ refer to the pixel values corresponding to the red, green, and blue digital image channels located at the $i^{th}$ row and $j^{th}$ column. Let $R'_{ij}$, $G'_{ij}$, and $B'_{ij}$ refer to the transformed pixel values of the output color digital image. The 3 by 4 matrix transformation relating the input and output pixel values is as follows:

$$R'_{ij} = \tau_{11}R_{ij} + \tau_{12}G_{ij} + \tau_{13}B_{ij} + \tau_{10}$$

$$G'_{ij} = \tau_{21}R_{ij} + \tau_{22}G_{ij} + \tau_{23}B_{ij} + \tau_{20}$$

$$B'_{ij} = \tau_{31}R_{ij} + \tau_{32}G_{ij} + \tau_{33}B_{ij} + \tau_{30}$$

where the $\tau_{mn}$ terms are the coefficients of the 3 by 4 matrix transformation. These twelve numbers are specific to the spectral characteristics of the capture device 10 and the intended image output device 30 shown in FIG. 2.

Different methods exist for applying a color transform to a color digital image, e.g. a 3-dimensional LUT may achieve even better results albeit at greater computational cost. If the $\tau_{10}$, $\tau_{20}$ and $\tau_{30}$ values are set to zero a simplified 3 by 3 matrix equation results. For the purposes of the present invention, a 3 by 3 matrix transform, 3 by 4 matrix transform, and a 3-dimensional LUT will all be considered examples of a color transform.

Details of the Logarithm Transform Processor 26

A characteristic of the color digital image produced by a capture device 10 which can impact the effectiveness of the present invention is the code value domain associated with capture device which produce color digital images. Typically the capture device 10 incorporates a photosensitive transducer element which converts the imaged light into an analog electrical signal. An analog-to-digital converter device is then used to transform the analog electrical signal into a set of digital code values. These digital code values constitute the numerical pixel values of the output color digital image produced by the capture device 10. The code value domain characteristic of a capture device 10 describes the mathematical relationship between the output digital code values and the input intensity of received light.

Many photosensitive transducer elements have a linear characteristic response, i.e. the electrical analog signal produced is linearly proportional to the intensity of received light. Many analog-to-digital converter devices have a linear characteristic response, i.e. the digital code values produced are linearly proportional to the intensity of received electrical analog signal. If a linear transducer element and a linear analog-to-digital converter are employed by a capture device the resulting output code values will have a linear relationship with the intensity of the received light. Thus the color digital images produced by capture devices which exhibit this linear relationship have numerical pixel values which have a linear relationship with the original intensity of light. Such color digital images will be termed to have a linear code value domain property.

The present invention may be applied to color digital images which have a linear code value domain property. However, better results are obtained with the present invention if the input color digital image has a logarithmic code value domain property, i.e. the numerical pixel values have a logarithmic relationship with the original intensity of light. The logarithm transform module 26 shown in FIG. 4 is employed to change the code value domain property of the color digital image input to the brightness tone scale module 100. The logarithm transform module 26 generates a look-up-table (LUT) transform populated with numerical values which have a logarithmic relationship to the LUT indices. Let $p_{ij}$ refer to the pixel values corresponding to a digital image channel located at the $i^{th}$ row and $j^{th}$ column. Let $p'_{ij}$ refer to the transformed pixel values of the output color digital image produced with the LUT transform. The LUT transform relating the input and output pixel values is as follows:

$$p'_{ij} = \text{LUT}[p_{ij}] \qquad (2)$$

where the [ ] notation refers to the LUT indexing operation, i.e. the output pixel value $p'_{ij}$ is given by the numerical value stored in the LUT at the index given by the input pixel value $p_{ij}$. The values stored in the LUT may be computed by the following mathematical relationship:

$$\text{LUT}[k] = L_o + L_1 \log(k + k_o) \qquad (3)$$

where the numerical constants $L_o$ and $L_1$ are used to determine the scale the output pixel values and the constant $k_o$ is used to avoid calculating the logarithm of zero.

The mathematical operation performed by the logarithm transform module 26 is an example of single valued function transform, i.e. each input value has a single corresponding output value. This operation may be implemented as a succession of mathematical operations (add, log, multiple, add) in computer hardware or software. However, for large color digital images the same operation is more computationally efficient implemented as a LUT transformation. For the purposes of the present invention, the LUT implementation and the succession of mathematical operations implementation will be referred to as logarithmic transforms.

Details of the Preferred Embodiment of the Noise Reduction Module 100

Figure 5:
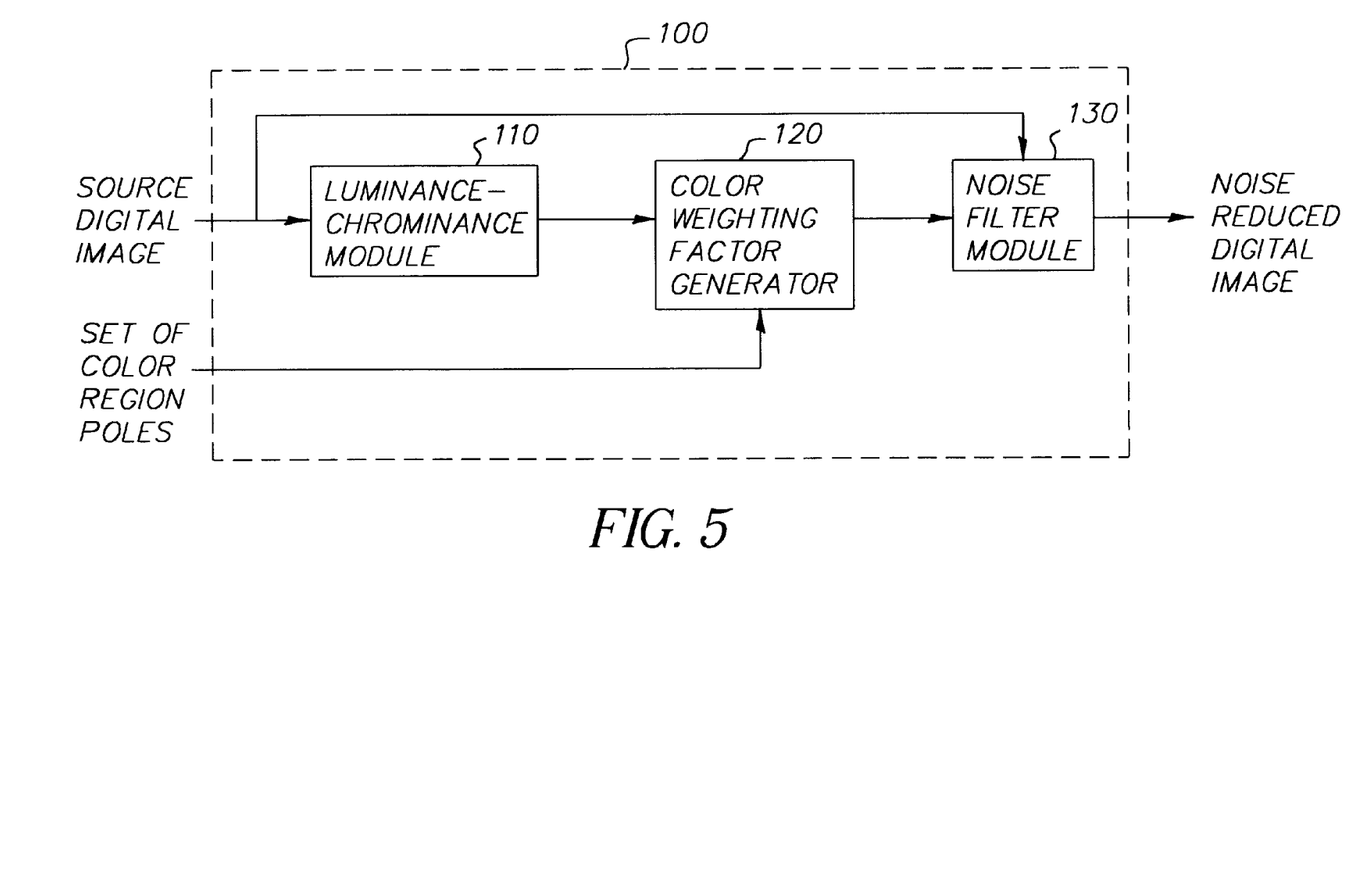
FIG. 5 is a block diagram showing the noise reduction module according to the preferred embodiment of the present invention.

The noise reduction module 100 depicted in FIG. 4 is shown in more detail in FIG. 5. The noise reduction module 100 performs the tasks of calculating a color weighting mask and using the color weighting mask in conjunction with a noise reduction filter to modify a source color digital image to produce a noise reduced color digital image with a less discernable noise than source color digital image. Let the source color digital image refer to color digital image produced by the previous image processing module in the digital image processor 20.

Referring to FIG. 5, the source color digital image channels of the source color digital image, typically three channels corresponding to red, green, and blue pixel information, are received by the luminance-chrominance module 110. This module produces three digital image channels; a luminance digital image channel and two chrominance digital image channels. The chrominance digital image channels are received by the color weighting factor generator 120 which produces a color weighting mask. The noise filter module 130 receives the color weighting mask and the source color digital image and produces a noise reduced color digital image.

Details of the Luminance-Chrominance Module 110

The analysis phase of the noise reduction module 100 depicted in FIG. 5 employs a luminance-chrominance module 110 to produce a luminance/chrominance, or LCC color digital image, version of the input color digital image consisting of a luminance digital image channel and two chrominance digital image channels denoted by GM and IL. The luminance-chrominance module 110 employs a 3×3 matrix transformation to convert the red, green, and blue pixel values into luminance and chrominance pixel values. Let $R_{ij}$, $G_{ij}$, and $B_{ij}$ refer to the pixel values corresponding to the red, green, and blue digital image channels located at the $i^{th}$ row and $j^{th}$ column. Let $L_{ij}$, $GM_{ij}$, and $IL_{ij}$ refer to the transformed luminance, first chrominance, and second chrominance pixel values respectively of the output LCC color digital image. The 3×3 matrix transformation relating the input and output pixel values is as follows:

$$L_{ij}=0.333\ R_{ij}+0.333\ G_{ij}+0.333\ B_{ij}$$

$$GM_{ij}=-0.25\ R_{ij}+0.05\ G_{ij}-0.25\ B_{ij}$$

$$IL_{ij}=-0.50\ R_{ij}+0.50\ B_{ij} \quad (4)$$

Those skilled in the art will recognize that the exact numbers used for coefficients in the luminance/chrominance matrix transformation may be altered and still yield substantially the same effect. An alternative embodiment of the present invention uses the following mathematical formulation:

$$L_{ij}=0.375\ R_{ij}+0.50\ G_{ij}+0.125\ B_{ij}$$

$$GM_{ij}=-0.25\ R_{ij}+0.50\ G_{ij}-0.25\ B_{ij}$$

$$IL_{ij}=-0.50\ R_{ij}+0.50\ B_{ij} \quad (5)$$

Details of the Color Weighting Factor Generator 120

A color weighting mask is a two dimensional array of numerical weighting factors. The numerical weighting factors of a color weighting mask relate to the relative importance of pixel location. Color weighting masks are used by the present invention in conjunction with a digital image channel to adjust or regulate the spatial processing of the pixels values of a color digital image.

Referring to FIG. 5, the color weighting factor generator 120 receives the chrominance digital image channels from the luminance-chrominance module 110 and a set of predetermined color region poles. Each color region pole includes a GM and IL value. These two values form a 2-dimensional coordinate location in color space. Let $GM_k$ and $IL_k$ denote the values of the $k^{th}$ color region pole and let N denote the number of color region poles in the set. Each color region pole represents a unique color in 2-dimensional color space for which the noise reduction processing of the source color digital image will be preferentially treated.

Figure 6:
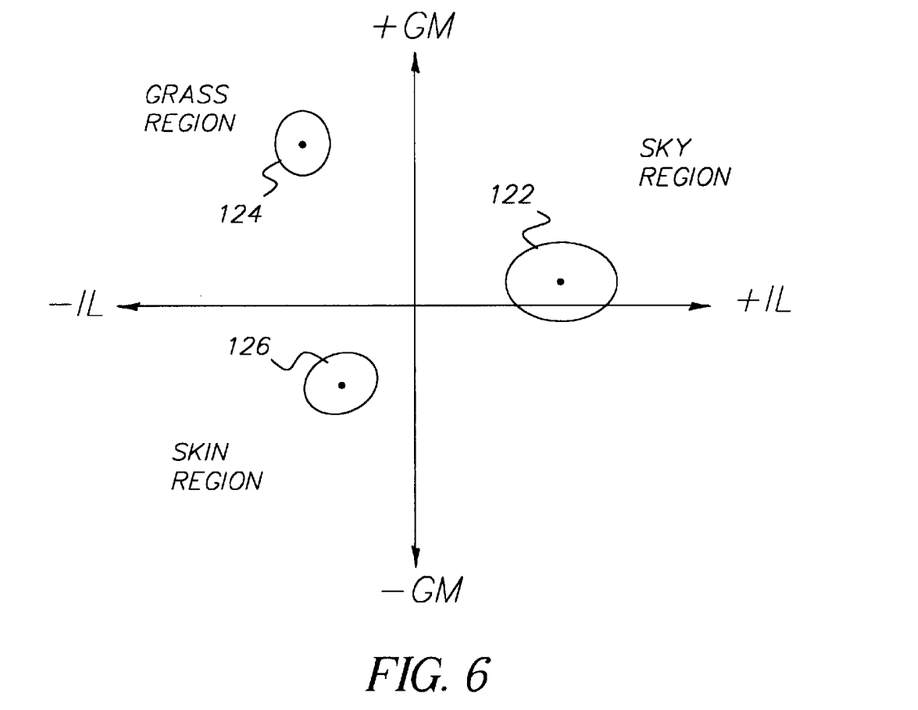
FIG. 6 is a diagram showing different color regions as practiced by the present invention.

Referring to FIG. 6, three regions differentiated for noise reduction processing are identified as a blue sky region 122, a green grass region 124 and a skin region 126. At the center of each of these color regions is the location of the of a corresponding color region pole. The actual numerical value of the GM and IL components of the color region poles depends on the color and/or logarithmic transformation used. For a given digital imaging application, once the color and/or logarithmic transformation experimentation with typical imagery is used to determine the numerical value of the color region pole GM and IL values.

Each color region pole can designate either emphasized or de-emphasized noise reduction processing of the pixels values of a color digital image depending the preference of the digital image processing application design goals. For the preferred embodiment of the present invention, design goal of reducing noise in color digital images includes a color region pole for the blue sky region of color space emphasizes more noise reduction while the color region pole for the green grass region of color space de-emphasizes noise reduction (less effective noise reduction). Consequently, color digital images processed with this configuration of the present invention will result in more noise removed from image blue sky regions than for image green grass regions.

The emphasis or de-emphasis of noise reduction processing is accomplished by calculating a color weighting factor for each pixel processed. The color weighting factor is a single numerical value which encompasses the sum total of emphasis and de-emphasis effects from all the color region poles in the set of color region poles. For each color region pole a two chrominance distance values, represented by x and y, are calculated as the distance from the location in color space of the $ij^{th}$ pixel to the $k^{th}$ color region pole for each color space dimension. Let $y_{ijk}$ represent the distance between the $k^{th}$ color region pole GM value and the GM value of the $ij^{th}$ pixel as $$y_{ijk}=GM_{ij}-GM_k \quad (6)$$

and $x_{ijk}$ represent the distance between the $k^{th}$ color region pole IL value and the IL value of the $ij_{th}$ pixel as $$x_{ijk}=IL_{ij}-IL_k \quad (7)$$

The range of color distance influence of the $k^{th}$ color region pole is determined by two corresponding pole parameters $\sigma_{xk}$ and $\sigma_{yk}$. As these pole parameters are set to larger numerical values the influence of the $k^{th}$ color region pole will be greater. The color pole weighting factor $\phi_k$ corresponding to the $k^{th}$ color region pole and $ij^{th}$ pixel is given by $$\phi_{ijk}=\alpha_{ok}+\alpha_k e^{-x_{ijk}^2/2\sigma_{xk}^2-y_{ijk}^2/2\sigma_{yk}^2} \quad (8)$$

where $\alpha_k$ is a color pole emphasis factor which determines the relative strength of the $k^{th}$ color region pole and $\alpha_{ok}$ is a numerical constant that determines the value of the $k^{th}$ color region pole for at large color distances. Positive color pole emphasis factors indicate more noise reduction processing emphasis while negative color pole emphasis factors indicate less noise reduction processing emphasis or a de-emphasis.

Additionally, the Gaussian quantion can be rotated in color space to provide more flexibility in defining a color region. Let $\theta_k$ represent the rotation angle in color space for the $k^{th}$ color region pole and let $x'_{ijk}$ and $y'_{ijk}$ represent the rotated coordinates and given by the equation $$x'_{ijk}=x_{ijk}\cos(q)-y_{ijk}\sin(q)$$

$$y'_{ijk}=x_{ijk}\sin(q)+y_{ijk}\cos(q) \quad (9)$$

The color pole weighting factor $\phi_k$ corresponding to the $k^{th}$ color region pole and $ij^{th}$ pixel is obtained by using equation (8) with the variables $x'_{ijk}$ and $y'_{ijk}$.

The values of the color pole emphasis factor $\alpha_\kappa$ can be adjusted for more or less effect depending on the digital imaging application. The preferred embodiment of the present invention uses a value of 1.0 for $\alpha_o$ and 0.25 for $\alpha_\kappa$ sky and flesh color regions and −0.25 for the green grass color region. The values for $\sigma_{xk}$ and $\sigma_{yk}$ are set to values identified uniquely for the flesh color, green grass color, and blue sky color regions. The present invention can be practiced with many different choices of chrominance value descriptions. However, to achieve optimum results, the values of the $\sigma_{xk}$ for and $\sigma_{yk}$ variables should be adjusted if a equation than as given by (5) is used to generate the chrominance values.

The color weighting factor for the $ij^{th}$ pixel $\omega_{ij}$ is given by the sum of all the individual color pole weighting factors $\phi_k$ as $$\omega_{ij}=\phi_o+\Sigma_k\phi_k \quad (10)$$

where $\phi_o$ is a numerical constant which determines the default value of the color weighting factors. Thus the color weighting factors $\omega_{ij}$ calculated for all the pixels of the source color digital image constitute a color weighting mask.

An alternative embodiment of the present invention calculates the color weighting factors $\omega_{ij}$ by multiplicatively combining the individual color pole weighting factors $\phi_k$ as $$\omega_{ij}=\phi_o+\Pi_k\phi_k \quad (11)$$

An alternative embodiment of the present invention bases the coordinate pair GM and IL values on a spatially filtered version of the pixels of the source color digital image. A spatial smoothing filter designed to reduce the amplitude of high spatial frequency modulations is used to filter the source color digital image. A 2-dimensional Gaussian filter is used as the spatial smoothing filter. The filtered version color digital image is processed with the luminance chrominance module 110 to produce the color space coordinates as used by the preferred embodiment of the present invention. This alternative embodiment of the present invention requires more computational resources due the additional processing step of spatially filtering. However, for vary noisy color digital images the benefit of this embodiment is a more gradual regulation of the noise reduction achieved.

Another alternative embodiment of the present invention calculates the color weighting factors $\omega_{ij}$ for each pixel in the source color digital image and assembles the values into a color weighting mask. This color weighting mask is then filtered with a spatial smoothing filter designed to reduce the amplitude of high spatial frequency modulations. The resulting spatially filtered color weighting mask is then used in similar fashion as described above.

Those skilled in the art will recognize that the present invention is not limited to three color regions but may be practiced with any number of color regions. Depending on the digital imaging application, any color region which can be found through experimentation as requiring a different level of noise reduction can be targeted as a chrominnace pole coordinate pair.

The chrominance pixel values of the two chrominance digital image channels are examples of color difference values derived from the pixels of the source color digital image. Although the present invention uses a 2-dimensional color space representation for simplicity and computational efficiency, those skilled in the art will recognize that the present invention can be practiced with color weighting factors calculated from other forms of color difference values calculated in other color space representations, but not limited to, CIELAB (a*,b* or C*,H*), CIELUV, and generalized RGB.

Details of the Noise Filter Module 130

Referring to FIG. 5, the noise filter module 130 receives the source color digital image and the color weighting mask from the color weighting factor generator 120 and uses the color weighting mask to adjust the noise reduction processing.

Figure 7:
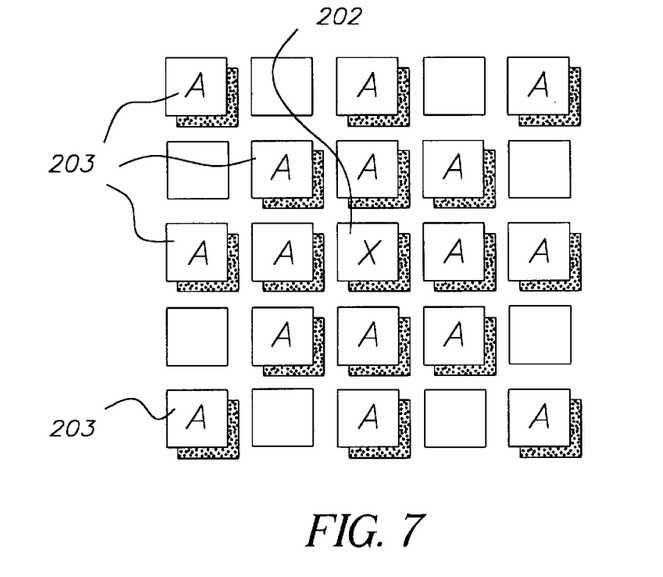
FIG. 7 is a block diagram showing a radial pattern local neighborhood of pixels used by to the present invention.

The Sigma filter, described by Jong-Sen Lee in the journal article *Digital Image Smoothing and the Sigma Filter*, Computer Vision, Graphics, and Image Processing Vol 24, p. 255–269, 1983, is a noise reduction algorithm designed to enhance the visual appearance of color digital images. The values of the pixels contained in a local neighborhood of pixels, n by n pixels where n denotes the length of pixels in either the row or column direction, are compared with the value of the center pixel, or pixel of interest. Each pixel in the s local neighborhood of pixels is given a weighting factor of one or zero based on the absolute difference between the value of the pixel of interest and the local neighborhood pixel value. If the absolute value of the pixel value difference is less or equal to a threshold $\epsilon$, the weighting factor if set to one. Otherwise, the weighting factor is set to zero. The numerical constant $\epsilon$ is set to two times the expected noise standard deviation. Mathematically the expression for the calculation of the noise reduced pixel value is given as $$q_{ij}=\Sigma_{mn}a_{mn}p_{mn}/\Sigma_{mn}a_{mn} \quad (12)$$

and $$a_{mn}=1 \text{ if } |p_{mn}-p_{ij}|<=\epsilon$$

$$a_{mn}=0 \text{ if } |p_{mn}-p_{ij}|>\epsilon$$

where $p_{mn}$ represents the $mn^{th}$ pixel contained in the local neighborhood of pixels, $p_{ij}$ represents the value of the pixel of interest located at row i and column j, $a_{mn}$ represents a weighting factor, $q_{ij}$ represents the noise reduced pixel value, and $\epsilon$ represents a threshold variable of the noise reduction process. The preferred embodiment of the present invention does not use all of the pixels in a rectangular local neighborhood of pixels. The radial pattern of pixels used within a 5 by 5 pixel rectangular local neighborhood of pixels is shown in FIG. 7. The pixel of interest $p_{ij}$ is marked with an X (item 202) while the pixels of the local neighborhood of pixels are marked with an A (items 203).

The noise form many sources of color digital images is signal dependent. The signal dependent noise and the chrominance dependent features of the present invention are incorporated into the expression for $\epsilon$ given by $$\epsilon = Sfac \omega_{ij} \sigma_n(p_{ij}) \qquad (13)$$

where $\sigma_n$ represents the noise standard deviation of the source image evaluated at the center pixel value $p_{ij}$. The parameter Sfac can be used to vary the degree of noise reduction. Both the Sfac and $\epsilon$ variables are examples of a noise adjustment parameter. The calculation of the noise reduced pixel value $q_{ij}$ as the division of the two sums is then calculated. The process is completed for some or all of the pixels contained in the digital image channel and for some or all the digital image channels contained in the color digital image. The noise reduced pixel values constitute the noise reduced color digital image.

Figure 8:
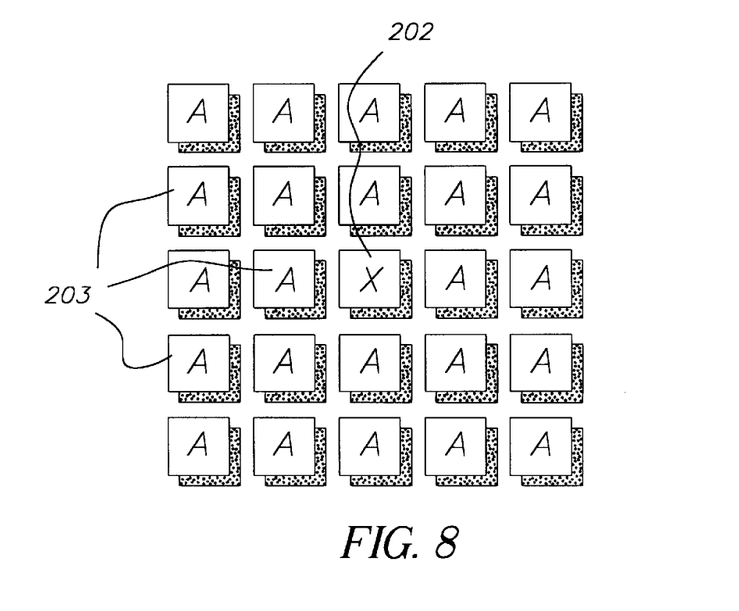
FIG. 8 is a block diagram showing a 5 by 5 pixel rectangular local neighborhood of pixels module used by to the present invention.
Figure 9:
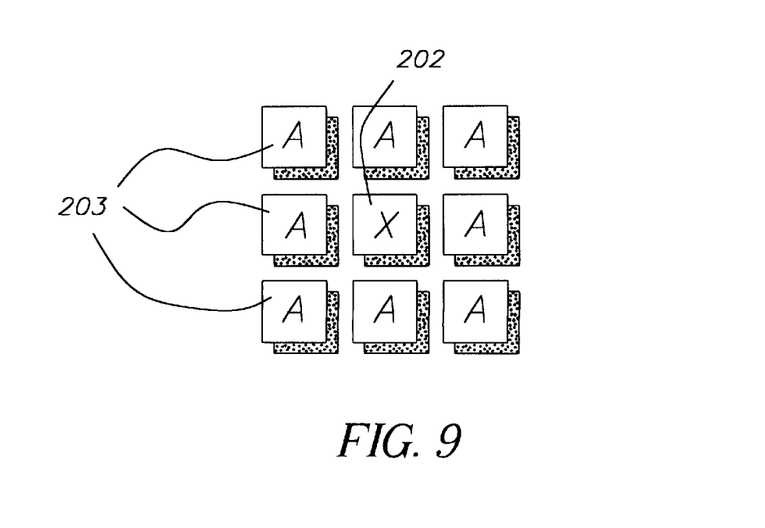
FIG. 9 is a block diagram showing a 3 by 3 pixel rectangular local neighborhood of pixels module used by to the present invention.

The present invention may be used to vary the level of noise reduction achieved by varying the size of the local neighborhood of pixels based on the color weighting factors $\omega_{ij}$. FIG. 8 shows a 5 by 5 pixel local neighborhood of pixels used to achieve more noise reduction while FIG. 9 shows a 3 by 3 pixel local neighborhood of pixels used to achieve less noise reduction. The same color weighting factors $\omega_{ij}$ as described above are used to determine the size of the local neighborhood of pixels. The range of $\omega_{ij}$ values is divided into different segments relating to the different sizes of local neighborhood of pixels. For example, pixels of interest with corresponding color weighting factors with values in the lowest one third of the range of of $\omega_{ij}$ values use a 3 by 3 pixel local neighborhood of pixels, the middle third of $\omega_{ij}$ values use a 5 by 5 pixel local neighborhood of pixels and the highest one third of the range of of $\omega_{ij}$ values use a 7 by 7 pixel local neighborhood of pixels.

The sigma filter as described by Lee is one example of a pixel difference filter that can be used in the present invention. The central aspect of a pixel difference filter is a spatial filter that calculates a noise free pixel estimate based on the pixel values in a local neighborhood of pixels about a pixel of interest, wherein the influence of each local pixel is based on the difference between the local pixel value and a reference numerical value derived from the pixels in the local neighborhood. The preferred embodiment of a pixel difference filter used in the present invention uses the pixel of interest as the reference numerical value. Other values such as the average of pixels in the local neighborhood can also be used as the reference numerical value.

Another example of a pixel difference filter is the Inverse Gradient Filter described by D. C. C. Wang et al. in their published paper *Gradient Inverse Weighted Smoothing Scheme and the Evaluation of its Performance*, Computer Graphics and Image Processing Vol 15, p. 167–181, 1981. This algorithm produced a noise cleaned image by taking a non-linear weighting of the local pixel values from a rectangular sampling region about the center pixel. The weighting factor was based on the magnitude difference between the center pixel and the surrounding pixel value.

Another alternative embodiment of the present invention uses a median filter as the basic noise reduction logic to form the noise reduced pixel value. As above, the color weighting factors $\omega_{ij}$ are used to vary the size of the local neighborhood of pixels.

The preferred and alternative embodiment of the present invention both use the color information of pixels in the source color digital image to calculate a weighting factor which is used to vary the level of noise reduction achieved. It has been shown that the level of noise reduction can be varied by regulating the size of the local neighborhood of pixels used or by varying a regulation variable directly. Since the color information based weighting factor (the color weighting factor $\omega_{ij}$) is based on a near continuous function (a function that can assume three or more values) of the pixel of interest color coordinates, the resultant noise reduction achieved is also continuous or near continuous. Thus color digital images processed with the present invention do not exhibit sharp or discontinuous variations in noise reduction.

The invention has been described in detail with particular reference to certain preferred embodiments thereof, but it will be understood that variations and modifications can be effected within the spirit and scope of the invention.

PARTS LIST 10 image capture device
20 digital image processor
22 enhancement transform module
24 color transform module
26 logarithm transform module
30 image output device
40 general control computer
50 monitor device
60 input control device
70 computer memory device
100 noise reduction module
110 luminance-chrominance module
120 color weighting factor generator
122 blue sky region
124 green grass region
126 skin region
130 noise filter module
140 RGB converter module
202 pixel of interest
203 local pixels

What is claimed is:

1. A digital image processing method for enhancing a color digital image having pixel values, comprising the steps of:

a) identifying a pixel of interest in the color digital image;
   b) using pixels from the color digital image to calculate a color weighting factor for the pixel of interest, including the steps of:
      (i) identifying one or more color regions in color space;
      (ii) calculating a pixel color coordinate in color space for the pixel of interest; and
      (iii) calculating the color weighting factor with the pixel color coordinate and the color regions;
   c) identifying a local neighborhood of pixels about the pixel of interest;
   d) using the color weighting factor and the values of pixels sampled from the local neighborhood to calculate a noise reduced pixel value;
   e) replacing the value of the pixel of interest with the noise reduced pixel value; and
   f) repeating steps (a) through (e) for other pixels in the color digital image.

2. The method claimed in claim 1, wherein step d) further comprises the step of calculating differences of pixel values sampled from the local neighborhood and using the differences of pixels values and the color weighting factor to calculate a noise reduced pixel value.

3. The method claimed in claim 2 wherein step d) further comprises the step of comparing the differences of pixel values with a threshold parameter and using the color weighting factor to vary the value of the threshold parameter.

4. The method claimed in claim 3 wherein step d) further comprises the step of varying the threshold parameter as a function of an expected noise level.

5. The method claimed in claim 4 wherein the expected noise level is signal dependent.

6. The method claimed in claim 1, wherein step (d) further comprises the step of using the color weighting factor to vary the size of the local neighborhood.

7. The method claimed in claim 6, wherein the noise reduced pixel value is derived from a statistical quantity of the pixel values sampled from a local neighborhood.

8. The method claimed in claim 7, wherein the statistical quantity is a mean, median, minimum, or maximum.

9. The method claimed in claim 1, wherein step (c) further comprises the step of: calculating a neighborhood color value derived from the values of pixels sampled from the local neighborhood of pixels about the pixel of interest, and calculating color distance value(s) from the neighborhood color value to the identified color region(s); and using the color distance values to calculate the color weighting factor.

10. The method claimed in claim 9, wherein the neighborhood color value is derived only from the pixel of interest.

11. The method claimed in claim 9, wherein the color weighting factor is calculated as a Gaussian function of the color distance values.

12. The method claimed in claim 11, wherein the color weighting factor is calculated using a Gaussian function of the color distance values for each identified color region.

13. The method claimed in claim 12, wherein the Gaussian functions are combined in an additive manner to calculate the color weighting factor.

14. The method claimed in claim 12, wherein the Gaussian functions are combined in a multiplicative manner to calculate the color weighting factor.

15. The method claimed in claim 1, further comprising the steps of calculating color difference values for the pixels in the color digital image and calculating the color weighting factors from the color difference values.

16. The method claimed in claim 1, wherein the color weighting factor causes more noise reduction for pixels of interest that are closer in color to one of the identified color regions.

17. The method claimed in claim 1, wherein the color weighting factor causes less noise reduction for pixels of interest that are closer in color to one of the identified color regions.

18. The method claimed in claim 1, wherein one of the identified color regions is the color of sky.

19. The method claimed in claim 1, wherein one of the identified color regions is the color of grass.

20. The method claimed in claim 1, wherein one of the identified color regions is the color of skin.

21. The method claimed in claim 15, wherein the color digital image has red, green, and blue digital image channels, and further comprising the steps of calculating color difference values as linear combinations of the red, green, and blue digital image channels, and identifying the color regions and calculating the color weighing factors in color difference space.

22. The method claimed in claim 15, further comprising the steps of calculating color difference values as CIELAB a* and b* components, and identifying the color regions and calculating the color weighing factors in color difference space.

23. The method claimed in claim 15, further comprising the steps of calculating color difference values as CIE C* and H* components, and identifying the color regions and calculating the color weighing factors in color difference space.

24. The method claimed in claim 15, further comprising the step of applying a spatial filter to the color difference values.

25. The method claimed in claim 15, wherein the color difference values are a different color space representation from that of the pixels sampled from the local neighborhood of pixels about the pixel of interest used to calculate a noise reduced pixel value.

26. The method claimed in claim 1, wherein a pixel difference filter is employed to calculate the noise reduced pixel.

27. The method claimed in claim 26, wherein the pixel difference filter is a sigma filter.

28. A computer program product embodied in a computer readable medium for performing the steps of claim 1.

29. A digital image processing apparatus for enhancing a color digital image having pixel values, comprising:
 a) means for identifying a pixel of interest in the color digital image;
 b) means for identifying a local neighborhood of pixels about the pixel of interest;
 c) means for using the values of pixels sampled from the local neighborhood to calculate a color weighting factor for the pixel of interest, and further comprising:
  (i) means for identifying one or more color regions in color space;
  (ii) means for calculating a pixel color coordinate in color space for the pixel of interest; and
  (iii) means for calculating a color weighting factor with the pixel color coordinate and the color regions;
 d) means for using the color weighting factor and the values of pixels sampled from the local neighborhood to calculate a noise reduced pixel value;
 e) means for replacing the value of the pixel of interest with the noise reduced pixel value; and
 f) means for repeating steps (a) through (e) for other pixels in the color digital image.

30. The apparatus claimed in claim 29, wherein the means of d) further comprises the means for calculating differences of pixel values sampled from the local neighborhood and using the differences of pixels values and the color weighting factor to calculate a noise reduced pixel value.

31. The apparatus claimed in claim 30, wherein the means of d) further comprises the means for comparing the differences of pixel values with a threshold parameter and means for using the color weighting factor to vary the value of the threshold parameter.

32. The apparatus claimed in claim 31, the means of d) further comprises the means for varying the threshold parameter as a function of an expected noise level.

33. The apparatus claimed in claim 32, the means of the expected noise level is also a function of the pixel values of the local neighborhood.

34. The apparatus claimed in claim 29, the means of (d) further comprises the means for using the color weighting factor to vary the size of the local neighborhood.

35. The apparatus claimed in claim 29, the means of (d) further comprises the means for using the color weighting factor to vary the size of the local neighborhood.

36. The apparatus claimed in claim 34, the means of the noise reduced pixel value is derived from a statistical quantity of the pixel values sampled from a local neighborhood.

37. The apparatus claimed in claim 36, the means of the statistical quantity is a mean, median, minimum, or maximum.

38. The apparatus claimed in claim 29, the means of (c) further comprises: calculating a neighborhood color value derived from the values of pixels sampled from the local neighborhood of pixels about the pixel of interest, and means for calculating color distance value(s) from the neighborhood color value to the identified color region(s); and using the color distance values to calculate the color weighting factor.

39. The apparatus claimed in claim 38, the means of the neighborhood color value is derived only from the pixel of interest.

40. The apparatus claimed in claim 38, the means of the color weighting factor is calculated as a Gaussian function of the color distance values.

41. The apparatus claimed in claim 40, the means of the color weighting factor is calculated using a Gaussian function of the color distance values for each identified color region.

42. The apparatus claimed in claim 41, the means of the Gaussian functions are combined in an additive manner to calculate the color weighting factor.

43. The apparatus claimed in claim 41, the means of the Gaussian functions are combined in a multiplicative manner to calculate the color weighting factor.

44. The apparatus claimed in claim 29, further comprising the means of calculating color difference values for the pixels in the color digital image and calculating the color weighting factors from the color difference values.

45. The apparatus claimed in claim 29, the means of the color weighting factor causes more noise reduction for pixels of interest that are closer in color to one of the identified color regions.

46. The apparatus claimed in claim 29, the means of the color weighting factor causes less noise reduction for pixels of interest that are closer in color to one of the identified color regions.

47. The apparatus claimed in claim 29, the means of the color weighting factor causes more noise reduction for pixels of interest that are closer in color to one of the identified color regions, and less noise reduction for pixels of interest that are closer to another one of the identified color regions.

48. The apparatus claimed in claim 40, the means of the color weighting factor causes more noise reduction for pixels of interest that are closer in color to one of the identified color regions.

49. The apparatus claimed in claim 40, the means of the color weighting factor causes less noise reduction for pixels of interest that are closer in color to one of the identified color regions.

50. The apparatus claimed in claim 40, the means of the color weighting factor causes more noise reduction for pixels of interest that are closer in color to one of the identified color regions, and less noise reduction for pixels of interest that are closer to another one of the identified color regions.

51. The apparatus claimed in claim 29, the means of one of the identified color regions is the color of sky.

52. The apparatus claimed in claim 29, the means of one of the identified color regions is the color of grass.

53. The apparatus claimed in claim 29, the means of one of the identified color regions is the color of skin.

54. The apparatus claimed in claim 29, the means of the color digital image has red, green, and blue digital image channels, and further comprising the means for calculating color difference values as linear combinations of the red, green, and blue digital image channels, and means for identifying the color regions and calculating the color weighing factors in color difference space.

55. The apparatus claimed in claim 29, further comprising the means of calculating color difference values as CIELAB a* and b* components, and identifying the color regions and calculating the color weighing factors in color difference space.

56. The apparatus claimed in claim 29, further comprising the means of calculating color difference values as CIE C* and H* components, and identifying the color regions and calculating the color weighing factors in color difference space.

57. The apparatus claimed in claim 44, further comprising the means of applying a spatial filter to the color difference values.

58. The apparatus claimed in claim 44, the means of the color difference values are a different color space representation from that of the pixels sampled from the local neighborhood of pixels about the pixel of interest used to calculate a noise reduced pixel value.

59. The apparatus claimed in claim 29, the means of a pixel difference filter is employed to calculate the noise reduced pixel.

60. The apparatus claimed in claim 59, the means of the pixel difference filter is a sigma filter.

61. The apparatus claimed in claim 59, the means of (d) further comprises the means for using the color weighting factor to vary the size of the local neighborhood.

* * * * *